United States Patent [19]
Olms et al.

[11] 3,932,886
[45] Jan. 13, 1976

[54] METHOD AND APPARATUS FOR MIXING AND RECORDING MULTI-TRACK STEREO AUDIO SIGNALS WHICH HAVE BEEN RECORDED AS SEVERAL INDIVIDUAL AUDIO SIGNALS

[75] Inventors: Karl-Adolf Olms, London, England; Rolf Schmidt, Hannover, Germany

[73] Assignee: Siemens Aktiengesellschaft, Berlin & Munich, Germany

[22] Filed: Feb. 25, 1974

[21] Appl. No.: 445,570

Related U.S. Application Data

[63] Continuation of Ser. No. 311,004, Nov. 30, 1972, abandoned, Continuation-in-part of Ser. No. 101,469, Dec. 28, 1970, abandoned.

[30] Foreign Application Priority Data
Jan. 14, 1970  Germany............................ 2001493

[52] U.S. Cl..................................... 360/13; 360/79
[51] Int. Cl.²................... G11B 27/02; G11B 31/00
[58] Field of Search............. 360/13, 15, 55, 69, 18, 360/79

[56] References Cited
UNITED STATES PATENTS

| | | | |
|---|---|---|---|
| 2,279,018 | 4/1942 | Wolfe | 360/13 |
| 3,169,773 | 2/1965 | Redlich et al. | 360/13 |

Primary Examiner—Robert S. Tupper
Attorney, Agent, or Firm—Hill, Gross, Simpson, Van Santen, Steadman, Chiara & Simpson

[57] ABSTRACT

A method of and apparatus for mixing and recording multitrack stereo audio signals from individual audio signals while utilizing the development of analog signals which are indicative of level, etc., converting the signals to digital form for clock controlled processing and reconverting to analog form to actuate mixing control elements.

10 Claims, 5 Drawing Figures

METHOD AND APPARATUS FOR MIXING AND RECORDING MULTI-TRACK STEREO AUDIO SIGNALS WHICH HAVE BEEN RECORDED AS SEVERAL INDIVIDUAL AUDIO SIGNALS

CROSS REFERENCE TO RELATED APPLICATION

This is a continuation of application Ser. No. 311,004, filed Nov. 30, 1972, now abandoned, which was a continuation-in-part of Ser. No. 101,469, filed Dec. 28, 1970, now abandoned.

BACKGROUND OF THE INVENTION

1. Field of the Invention

This invention relates to a method and apparatus for mixing and recording multi-track audio signals from several individual audio signals, and more particularly to a method and apparatus which utilizes control elements assigned to the individual audio signals, or to their channels, in order to influence level, frequency, or other such recording parameters.

2. Description of the Prior Art

Both technical and artistic problems occur during the mixing of audio signals which have been recorded on several channels, in order to produce a multi-track stereo recording, since the attention of the sound technician is continuously overloaded due to the plurality of necessary level adjusters and frequency response adjusters which must be actuated continuously, depending on, for example, the musical performance, and he might thereby be distracted from his artistic tasks. Due to these reasons, there is a desire to continuously record the mixing process and, if necessary, to divide the process into several sub-processes in order to be able to repeat the mixing process automatically and to correct the mixing program. Furthermore, a control of the individual adjuster positions should also be possible, for example, by means of recording level diagrams or by means of overhearing techniques. In addition, it is desirable that the individual signals be recorded with as high a level as possible on the primary sound carrier before the mixing process.

Prior art techniques fulfill, respectively, only some of the above requirements. Therefore, particular difficulties arise on the correction of level control programs, for example, if use is made of conductive sections on the primary carrier, such as contact strips on a magnetic tape, or of a separate perforated tape. In addition, the number of final control elements with a fairly large number of recording channels is so large that the storage capacities of the storage means which are applied in prior art systems are no longer sufficient.

SUMMARY OF THE INVENTION

This invention teaches how the foregoing requirements can be met in as simple a manner as possible while avoiding the drawbacks of prior art methods. According to the invention, which is related to a method of the aforementioned kind, the above objective is achieved in a manner that the variable regulated quantities which occur during the mixing process are provided as analog signals in scanning cycles which are controlled by means of synchronous pulses, transformed into digital pulse successions and—with the assignment of an address which characterizes the respective final control member—recorded periodically and continuously in a track of a multi-track primary carrier containing the multi channel audio signals, which track has been kept free, while simultaneously, the original audio signal which has been changed correspondingly by means of the individual regulated quantities is recorded on a second carrier as a multi-channel stereophonic version. An advantage of this method results from the fact that the audio information and the control program are present on the same storage medium, namely on the primary carrier. Therefore, the timely coincidence between the audio information and the corresponding control order is ensured in a simple manner.

It is also possible by means of practicing the present invention to automatically control steady transfers and cut-outs which is not possible with most prior art techniques since they are generally limited to state, for example, release processes for step-by-step switches or other similar controls. Finally, there is no difficulty with the method of the present invention to record a complex and complicated mixing program in several successive steps which, for example, might serve to attain a desired total acoustic impression of the mixing product in stages, as long as there are enough available tracks.

As mentioned above, this invention has been developed, as the human brain will not simultaneously follow the full content in multi-track recordings when the level of all playback tracks is to be changed into the most successful mix down. The invention enables the balance engineer to concentrate on the program of each track step by step. For example, sixteen or more fader positions are converted into sequential digital words which are recorded on one of two or more spare remote tracks simultaneously with the audio program. The digital remote signal is built up by positive or negative pulses at a 5 kHz pulse frequency. In the remote mode of operation the 16 sequential digital words are converted into voltages which are analogous to the fader positions. When logarithmic voltage control amplifiers are fed by the analog output of the apparatus an automatic mix down is obtained.

A logarithmic voltage controlled amplifier is regulated by the apparatus in 60 1dB steps in the upper range of the fader, and in 3–4dB steps in the lower range down to 79 dB, and finally a fader "off" position is provided by which the analog control signal is set to "zero." Although 1 dB steps are chosen in this particular design, no clicks are audible during a fade-out, because of the logarithmic law (dB) in the control voltage, based on the smaller number of digital bits which a linear controlled signal would require.

The apparatus described in detail below may be switched to "manual" and later back to "remote" modes of operation when a further mixed program is to be recorded without a level drop during change over. This is obtained by comparator circuits which activate red or green light emitting diodes at each fader when a fader would give more (red) or less (green) analog control voltage than the remote signal.

The repeat cycle of each fader is determined by the amount of bits/fader/fader quantity time of one imaginary sequence separation bit, and the pulse frequency:

Therefore:

$$\frac{(\text{amount of bits/fader} \times \text{fader quantity}) + 1}{\text{pulse frequency (Hz)}} = \frac{7 \times 16 + 1}{5000} = \frac{1}{44} \sec = 22.7 \text{ms}$$

Therefore no audible steps are effected during a fast fade-out.

As the binary pulse signal on the remote track operates as a clock pulse generator (5 kHz) the remote signal is only clocked by the apparatus control circuit when the first mix is recorded on the remote track. This is necessary because the clock pulse generator will not be in correct phase if the binary signals has a portion thereof to be changed and recorded on a second remote track. The approach to the final mix program is made by alternate use of two or three remote tracks which are spares on the multi-track recorder. It may also be possible to use a single track width with a small extra three track head.

The apparatus detects possible drop outs which can occur during the running of the tape as a memory. The analog control voltages remain in their last sequential level until a complete 112 bit sequence is played back again without any bit loss.

The remote track level is 20 dB below standard alignment tape 0 dB level. It has been chosen as the cross talk of and to an audio track may disturb either the apparatus input trigger circuit or with higher pulse level the audio signal on an adjacent audio track.

The apparatus consist of two relatively small units and a power supply unit: The mix panel has eight double digital faders and seven automatically corresponding push buttons to control up to three remote tracks in clock, record or remote modes; the control unit contains 16 equal plug-in channel circuits with digital coder/decoder, signal comparator, shift register, latch circuit and digital/analog converter circuits and one plug-in card for logic control circuits and a pulse former/decoder network; and the power supply has a 5 volt output for integrated circuits and a ± 12 volt output for the analog circuits and relays.

BRIEF DESCRIPTION OF THE DRAWINGS

Other objects, features and advantages of the invention will be best understood from the following detailed description taken in conjunction with the accompanying drawings, on which.

DESCRIPTION OF THE PREFERRED EMBODIMENTS

Figure 1:
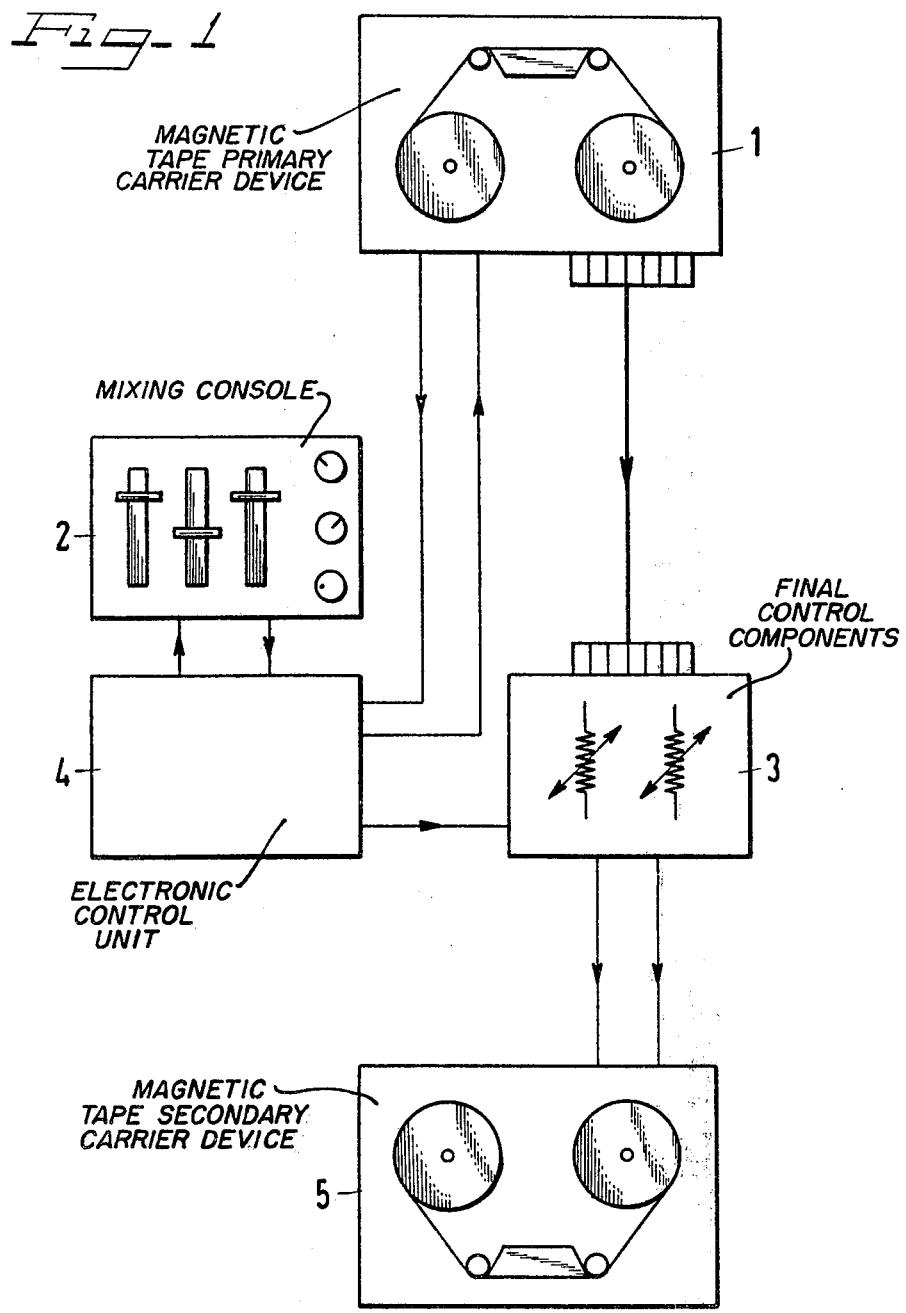
FIG. 1 is a schematic block diagram of apparatus for practicing the invention.
Figure 2:
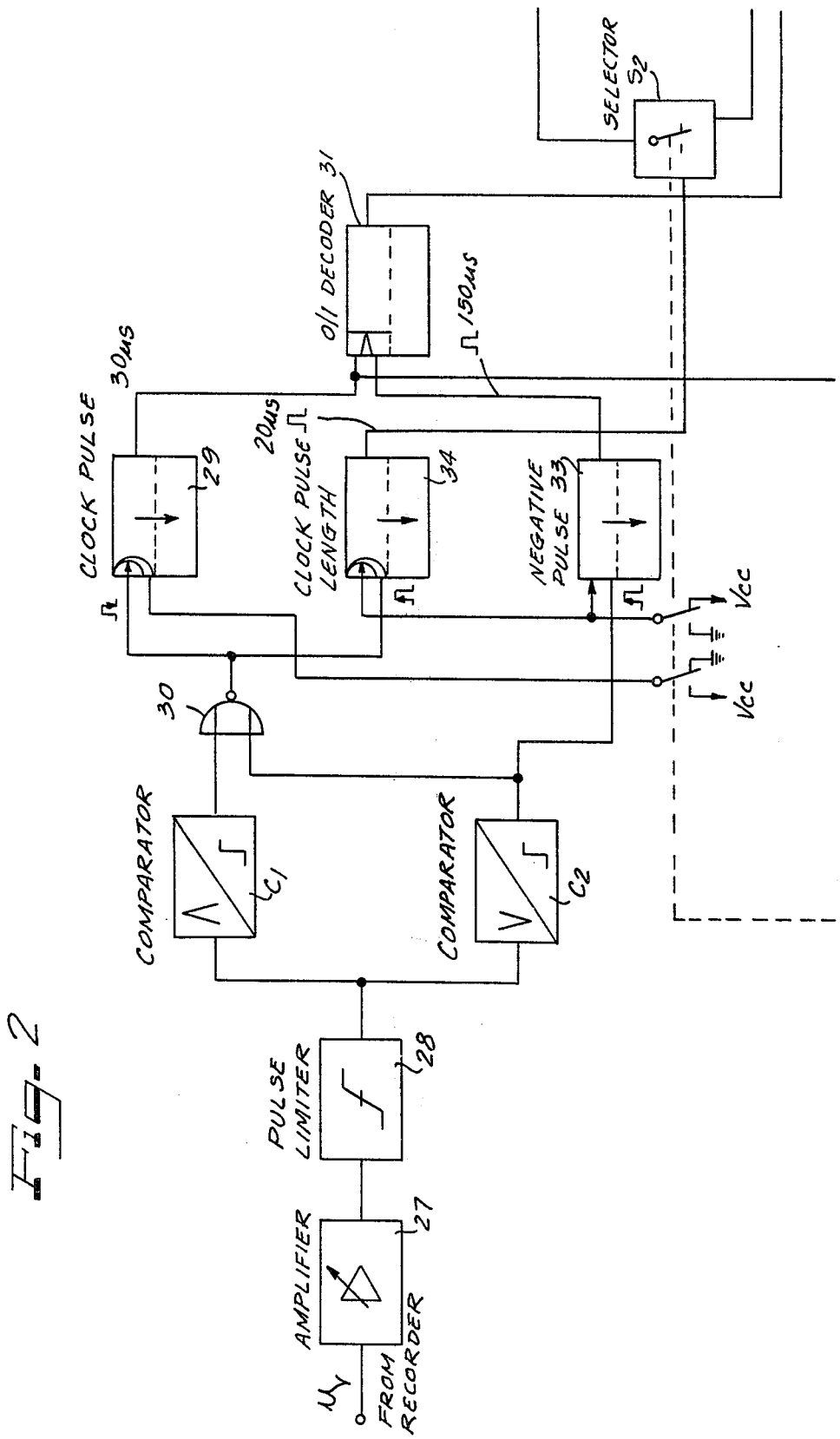
FIGS. 2–4, when arranged according to the diagram of FIG. 5, together form a logic diagram of the control circuit and one of a plurality of channel circuits of apparatus embodying the principles of the present invention.

Referring to FIG. 1, one or several tracks on a magnetic tape 1 are reserved for the recordings of the control processes which are needed for the mixing process of the present invention. The magnetic tape 1 serves as the primary carrier. The remaining tracks are provided for the storage of individual audio signals.

A mixing console 2 contains a plurality of control elements, such as adjusters for level, frequency response, echo, group and sum. These control elements supply analog output signals which are proportional to the respective positions of the individual adjusters, however, they do not influence the useful information. Among other things, it is the task of these analog signals to actuate final control members. Motor driven potentiometers may, for example, be applied as final control members 3, which lie in a closed control loop. In the case of an electronic amplitude control, the changeable damping can be produced, for example, by means of photo-conductive cells, field effect transistors, thermistors or similar components.

In order to provide answering signal and control, an auxiliary voltage can be applied to the final control members 3. The frequency of this alternating voltage thereby lies outside of the range of audibility, whereby electric filters isolate the alternating voltage from all preceding and succeeding amplifiers.

The analog control voltage is furthermore extended to an analog/digital converter in an electronic unit 4 which operates, for example, as a stage encoder. The regulated output of the controller, which has originally been provided as an analog value, is available as a digital pulse succession in an intermediate memory. The analog/digital converter and intermediate memory are utilized in a multiplex operation. The switch over to the different final control members is thereby effected with the help of a ring counter which is controlled by a central time element (clock). In addition, the ring counter in a parallel-series transformation causes the read out of the address information which, respectively, belongs to the individual final control members.

The pulse program for each channel is therefore composed as follows: synchronous pulse-address information-control information-brake. The program is recorded as a pulse succession with individual pulses on a free track of the magnetic tape 1, whereby the pulse length is selected in such a manner that it corresponds to one half of the upper limit frequency of the magnetic sound recording system.

During a repetition of the above described mixing process, the recorded digital pulse successions are again transformed into analogous amplitude values by the utilization of a multiplexer and a digital/analog converter, and assigned to respective channels or final control members.

The final control members, as was mentioned above, are designed either as electronic systems (for example light source/photo conductive cell or field effect transistor) or as electro-mechanical systems (motor potentiometers with a follow-up circuit) and they control the level corresponding to the previously determined pulse succession. Advantageously, the course of the level values can be indicated at corresponding points, for example, by means of light indication instruments, or recorded by means of registering devices. This is advantageously effected by means of utilizing an overlying audio frequency pilot voltage which is prepared in a suitable manner for this application.

During a possible correction, the combined reading and recording head which is provided for the control track serves as a recording head. A statement of the theoretical value is thereby effected with the help of adjusters which are present in the mixing desk 2, which adjusters supply both the analog value for the new corrected control recording and the control voltage for the electronic or electro-mechanical adjusting members.

A mixing process occurs both with a manual operation by means of actuating the individual adjusters and with an automatic operation where the processing of an audio signal recorded on a multi-channel carrier is effected with the help of a pulse program which is present on the control track, and during this mixing process, the multi-channel primary information is transferred onto a second information carrier which is designed, for example, as a magnetic tape 5, and into a common two-track stereo recording.

In an advantageous further development of the invention it is provided that more than one track be available on the magnetic tape 1 for the recordation of control signals. With the automatic repetition or correction of the stored mixing program, the pulse program which is stored on a first track of the primary carrier is transmitted onto a second control track, which is kept free, either unchanged or modified, while the new pulse succession is inscribed into the first track. This has the advantage that the originally recorded pulse program remains for the purpose of comparison, or for further applications. Only with a repeated repetition or correction, the contents which were originally stored in the first track will be deleted. Of course, it is possible to provide several control tracks on the magnetic tape 1, depending on the available storage supply, in order to have correspondingly many development stages of the final mixing program available. Furthermore, it can be provided that the control pulse successions are stored on a data carrier which is independent from the primary carrier with a transport movement which is synchronized with that of the primary carrier. This technique makes it possible to utilize all tracks of the primary carrier in an advantageous manner exclusively for useful information.

DETAILED DESCRIPTION

Referring to FIGS. 2–5, a more detailed description of a preferred embodiment of the invention is provided, and the operation of the apparatus is discussed by referring to three modes of operation, the clock mode, the remote mode, and the remote with record mode.

Figure 3:
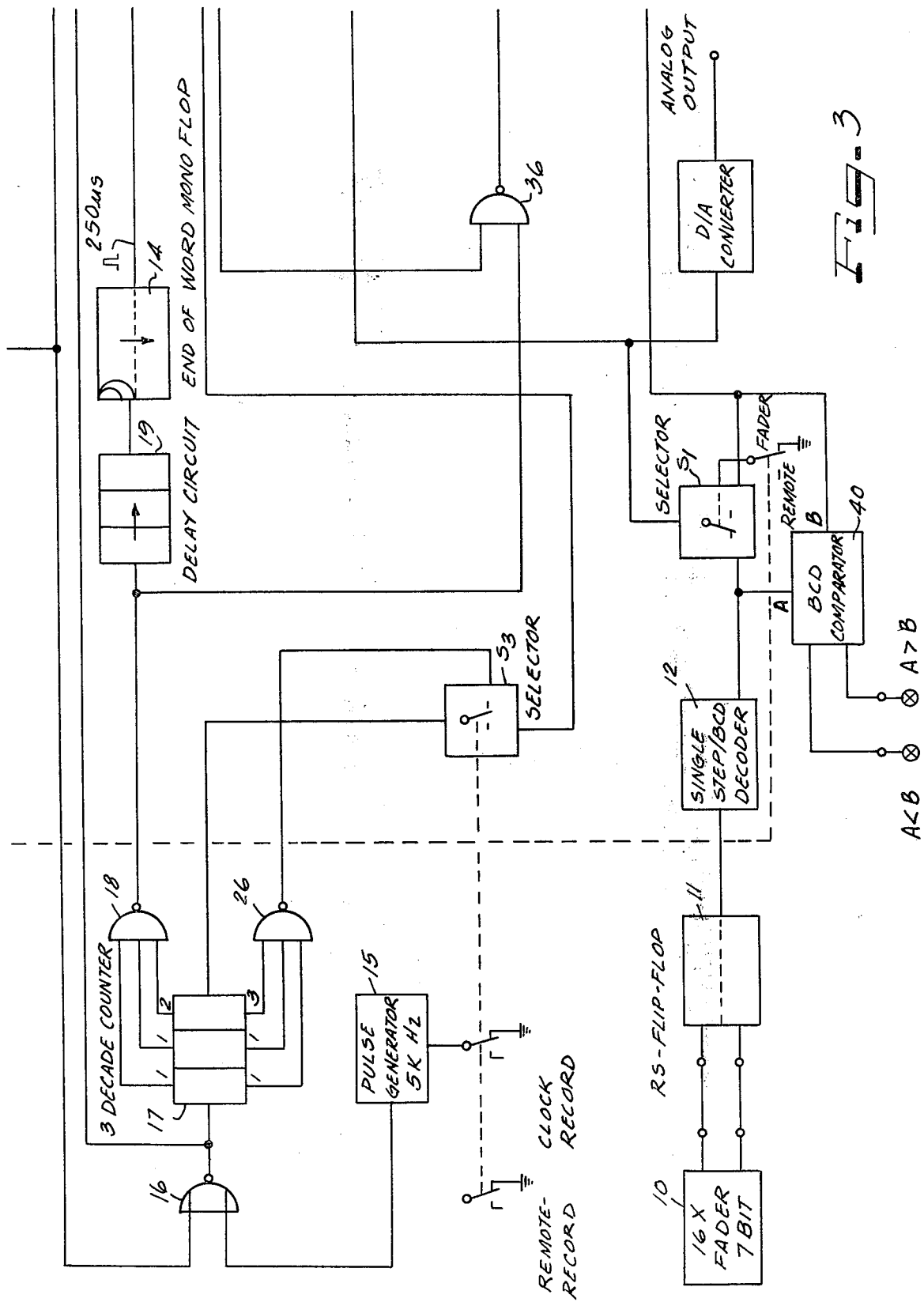
Figure 4:
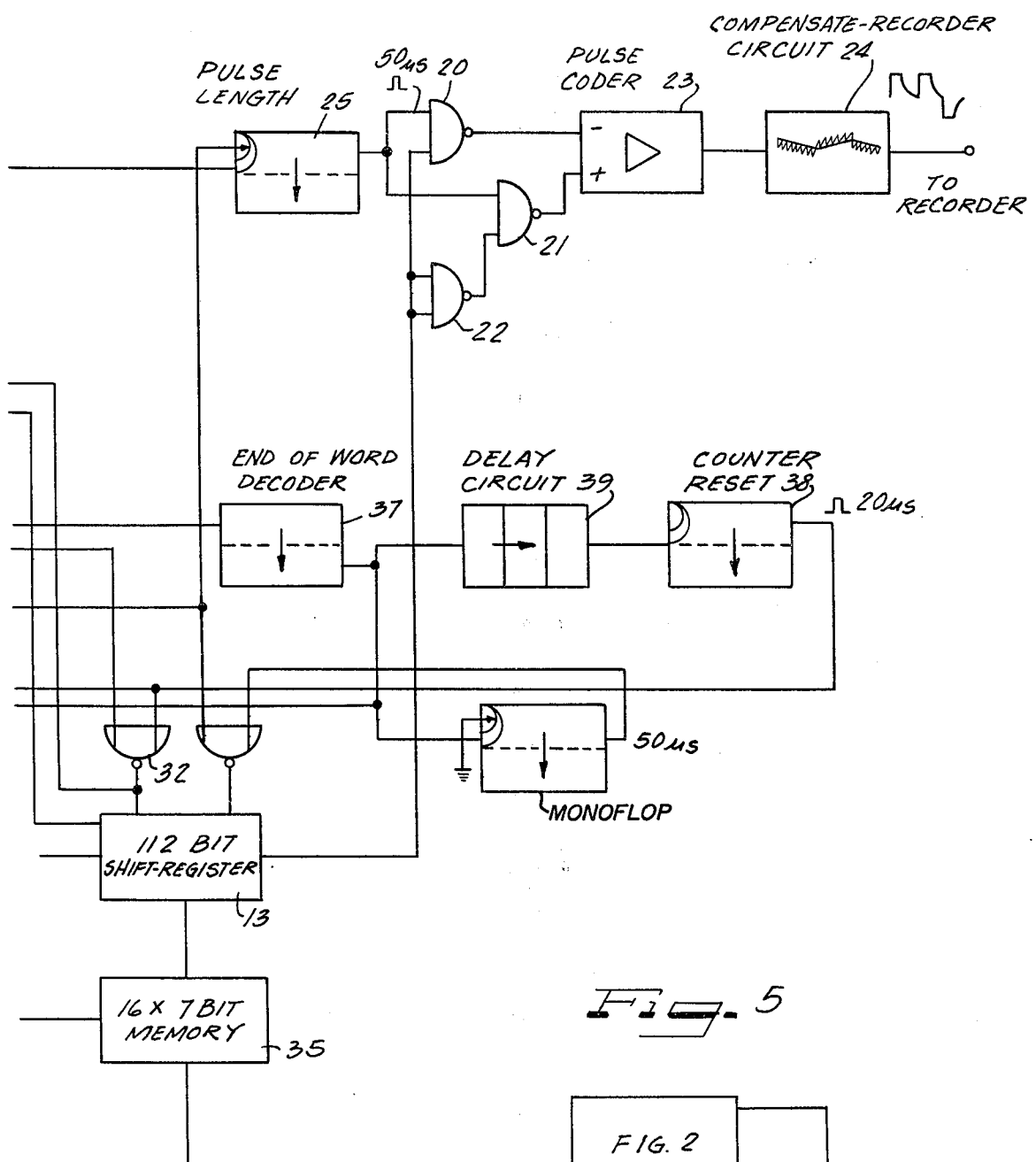
Figure 5:
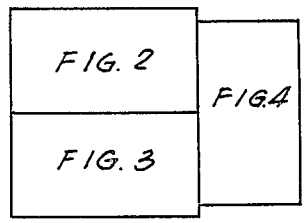

In FIGS. 3 and 4, the apparatus generally extending between the digital fader 10 and the shift register 13 is a channel circuit and is provided in multiple, for example 16 channels, to the shift register 13. The remainder of the apparatus constitutes the control circuit and is provided only once in the system. The following discussion is, of course, only exemplary with respect to the number of word bits and the number of channels.

Clock Mode

The 7 bit digital fader 10 sets the RS-flip-flop 11 in a single step code. A single step code is necessary as a binary or decimal code would not have the correct digital word when more than one bit changes simultaneously at a fader step. A single step/BCD decoder 12 allows the use of available inexpensive integrated circuits in the later logic circuits. By passing the (electronic) selector S1 which is automatically switched to the fader 10, the BCD signal is fed to seven parallel inputs of the 112 bit shift register 13. For 16 channels, the sixteen faders will provide $16 \times 7 = 112$ bit to the shift register 13 which is clocked into a "parallel in mode" operation by a 250 $\mu$S pulse with the end of word monoflop 14. A 112th pulse of the 5 kHz pulse generator 15 activates the end of word monoflop 14 by way of a NOR gate 16, a three decade counter 17, a NAND gate 18, and a delay circuit 19. The shift register 13 is set in the "shift serial mode" operation at the (250 $\mu$S) pulse end of the end of word monoflop 14. The 5 kHz pulse generator 15 now shifts by way of the NOR gate 16 the 112 bits through the shift register 13 to the NAND gate 20 and to the NAND gates 21 and 22. The NAND gates 20 and 21 have outputs which are respectively connected to the negative and positive inputs of a pulse coder operational amplifier 23. Before the pulses are fed to the recorder inputs, they are required to pass a compensate recorder circuit 24. The circuit 24 is necessary to compensate a disturbing sawtooth wave effect, caused by the recording-playback process, where positive and negative pulse rows add an inverted integrated dc level to the pulse level. The pulse length is controlled through a pulse length monoflop 25 which is started by each clock pulse by way of the selector S2.

The three decade counter 17 is reset to 0 by the 113th pulse of the internal 5 kHz pulse generator 15 by way of the NAND gate 26 and a selector S3.

Remote Mode

The pulse signal from a recorded remote track is received by an amplifier 27 and passed by way of a pulse limiter 28 to a pair of comparators C1 and C2. The comparators C1 and C2 are triggered by the positive and negative pulse signals, respectively. The comparators C1 and C2 start a clock pulse monoflop 29 by way of NOR gate 30 with the negative edge of the pulses. The clock pulses arrive at the three stage decade counter 17 by way of the NOR gate 16 and through a 0/1 decoder 31 to the serial input of the shift registers 13, which shifts in the serial mode by clock pulses provided through a NOR gate 32. The 0/1 decoder 31 output is 0 when a negative pulse monoflop 33 (started with the positive edge of a pulse) and a clock pulse monoflop 29 are activated simultaneously. A 1 occurs only if the clock pulse monoflop 29 is started (with the negative edge of a pulse). To operate correctly in time with the binary signal at the shift register output a clock pulse length monoflop 34 (started with the positive edge of the pulse) activates the pulse length monoflop 25 by way of the selector S2.

A completely counted (112 bit) sequency signal (no drop outs are detected) clocks the $16 \times 7$ bit memory 35 of a channel circuit by way of a NAND gate 36 in the "parallel in mode" operation when the clock pulse monoflop 29 signals, by way of an end of word decoder 37 (retriggerable monoflop) a sequence separation bit (no pulse signal on the remote track, virtual 113th bit). During the serial mode of operation of the shift register 13, the $16 \times 7$ bit memory 35 stores the last sequence.

The counter 17 is reset to 0 by a counter reset monoflop 38 by way of the selector S3 with a delayed signal (delay circuit 39) of the retriggerable end of word decoder 37, or when a drop out interrupts a sequence. The counter reset pulse clocks the shift register 13 with a virtual 113th pulse by way of the NOR gate 32.

During the remote mode, the parallel inputs of the 112 bit shift register 13 are fed by the $16 \times 7$ bit memory 35 outputs via the selector S1.

Remote with Record Mode

The remote with record mode is the complete remote operation as described above, with the exception of the 7 bit in parallel signals which are fed to the 112 bit shift register 13 either from a fader 10 (new mixed program)

or from the 16 × 7 bit memory 35 parallel outputs (remote mix).

In the remote and remote with record modes of operation, a BCD comparator 40 signals the digital difference between the signals from the 16 × 7 bit memory 35 and the fader 10. In the clock mode, light emitting diodes at the outputs of the BCD comparator 40 are switched off as an incoherent bit configuration at the memory outputs would disturb the balance engineer. In the latter two discussed modes of operation, however, the light emitting diodes are effective to aid the engineer in the mixing process.

Although we have described our invention by reference to a specific illustrative embodiment thereof, many changes and modifications of the invention may become apparent to those skilled in the art without departing from the spirit and scope of the invention. Wee therefore intend to include within the scope of the patent warranted hereon all such changes and modifications as may reasonably and properly be included within the scope of our contribution to the art.

We claim:

1. A method of producing a single composite sound recording from recordings of a plurality of subsidiary audio signals individually recorded on separate tracks of a multi-track primary carrier to provide a number of output channels which is less than the number of subsidiary audio signals, comprising the steps of reading the subsidiary audio signals from the primary carrier, mixing the subsidiary audio signals, contemporaneously with said mixing varying control elements assigned to the subsidiary audio signals to vary acoustic characteristics of said audio signals including level and frequency response, sampling during scanning cycles controlled by synchronizing pulses the positions of the control elements in succession to obtain the varied quantities as analog values, converting the sampled values into digital pulse trains which correspond to the respective control elements, recording the digital pulse trains in succession during recurrent cycles on at least one additional track of the multi-track primary carrier which contains the recordings of the subsidiary audio signals, and recording the mixed audio signals on a second carrier having said number of output channels.

2. A method according to claim 1, wherein the step of mixing is carried out during a plurality of successive control element varying operations and said step of recording the pulse trains is further defined as recording the pulse trains one after the other in the same control track of the multi-track primary carrier.

3. A method according to claim 1, wherein said step of mixing is carried out during a plurality of successive control element varying operations and wherein said step of recording the digital pulse trains is further defined as storing the pulse trains sequentially in separate control tracks of said multi-track primary carrier.

4. A method according to claim 1, wherein said step of recording the mixed audio signals is further defined as recording the mixed signals for stereophonic reproduction on a secondary carrier having two output channels.

5. A method of producing a single composite sound recording from recordings of a plurality of subsidiary audio signals individually recorded in separate tracks on a multi-track primary carrier to provide a number of output channels which is less than the number of subsidiary audio signals, comprising the steps of: reading the subsidiary audio signals from the primary carrier, mixing the subsidiary audio signals, during mixing of the audio signals varying control elements respectively assigned to said audio signals to vary acoustic characteristics thereof, sampling in succession the position of the control elements to obtain the varied quantities as analog values during scanning cycles controlled by synchronizing pulses, converting the sampled values into digital pulse trains, assigning addresses to the digital pulse trains corresponding to the respective control elements and to respective final control elements to be adjusted during subsequent recording, recording the digital pulse information in succession on the primary carrier with the subsidiary audio signals during recurrent cycles, synchronizing a second carrier with the primary carrier, and recording on the second carrier from the primary carrier containing the recordings of the subsidiary audio signals a composite signal mix of signals produced by said mixing under the control of the final control elements, said second carrier providing said number of output channels.

6. Apparatus for mixing individually recorded audio signals and recording the mix as a multi-track stereo recording, comprising: a first information carrier means including a plurality of channels each storing audio signals and at least one control channel magnetically storing digital control signals recorded periodically and continuously and corresponding to recording parameters for said audio signals; reading means connected to said first information carrier means to read the audio signals; a second information carrier means connected to said first information carrier means via said reading means for receiving a mix of said audio signals; program mixing means including a plurality of controllable elements connected between said first and second carrier means assigned to respective channels and operable to vary the audio characteristics of the respective audio signals; program mix control means connected between said first information carrier means and said controllable elements for reading said magnetically recorded digital control signals and responsive to said digital control signals to control the operation of said controllable elements to vary the audio characteristics in accordance with said recording parameters, said digital control signals including address signals identifying the controllable elements and recording parameter control signals for each channel and said program mix control means comprising a plurality of channel circuits each including a digital/analog converter connected to the respective controllable element for changing digital control signals to analog control signals for controlling said controllable elements, means for receiving and storing the digital control signals, and scanning means for multiplexing said receiving and storing means to said plurality of channel circuits in accordance with the address signals.

7. Apparatus according to claim 6, wherein each of said channel circuits comprises a fader operable to provide channel digital control signals representing an audio characteristic; a memory for receiving the respective multiplex digital control signal; a comparator circuit connected to said memory and to said fader for comparing said digital control signals from said fader and from said memory; and indicator means connected to and operated by said comparator circuit to indicate the relative magnitudes of the values represented by said digital signals.

8. Apparatus for mixing individually recorded audio signals and recording the mix as a multi-track stereo recording, comprising: a first information carrier means including a plurality of channels each storing audio signals and at least one control channel magnetically storing digital control signals recorded periodically and continuously and corresponding to recording parameters for said audio signals; reading means connected to said first information carrier means to read the audio signals; a second information carrier means connected to said first information carrier means via said reading means for receiving a mix of said audio signals; program mixing means including a plurality of controllable elements connected between said first and second carrier means assigned to respective channels and operable to vary the audio characteristics of the respective audio signals; program mix control means connected between said first information carrier means and said controllable elements for reading said magnetically recorded digital control signals and responsive to said digital control signals to control the operation of said controllable elements to vary the audio characteristics in accordance with said recording parameters, wherein said program mix control means comprises means for generating said digital control signals for storage in said control channel including a plurality of channel circuits each comprising a fader operable to provide channel digital control signals, and a digital/analog converter connected between said fader and the respective controllable element; storage means connected to each of said faders for storing the channel digital control signals; means for recording digital signals on said first information carrier means; and scanning means connected between said storage means and said means for recording digital signals for continuously cyclically transferring the respective channel digital control signals to said first information carrier means.

9. Apparatus for mixing individually recorded audio signals and recording the mix as a multi-track stereo recording, comprising: a first information carrier means including a plurality of channels each storing audio signals and at least one control channel magnetically storing digital control signals recorded periodically and continuously and corresponding to recording parameters for said audio signals; reading means connected to said first information carrier means to read the audio signals; a second information carrier means connected to said first information carrier means via said reading means for receiving a mix of said audio signals; program mixing means including a plurality of controllable elements connected between said first and second carrier means assigned to respective channels and operable to vary the audio characteristics of the respective audio signals; program mix control means connected between said first information carrier means and said controllable elements for reading said magnetically recorded digital control signals and responsive to said digital control signals to control the operation of said controllable elements to vary the audio characteristics in accordance with said recording parameters, wherein said program mix control means comprises a number $n$ of channel circuits each including a digital fader operated to provide an $m$-bit digital signal representing a control parameter for the respective channel, an RS flip-flop connected to and operated by said fader for changes in fader setting, a single step BCD decoder connected to said RS flip-flop, and a D/A converter connected between said BCD decoder and operated thereby to provide a BCD decoded output representing fader setting and the respective controllable element for controlling the controllable element with an analog signal derived from the BCD output, an $n \times m$-bit shift register connected to each of said BCD decoders to receive said $m$-bit signals in parallel, a pulse coder in said recording means connected between said shift register and said first information carrier means, and clock means for serially transferring the $n \times m$-bits stored in said shift register to said pulse coder.

10. Apparatus for mixing individually recorded audio signals and recording the mix as a multi-track stereo recording, comprising: a first information carrier means including a plurality of channels each storing audio signals; a source of digital control signals recorded on the first information carrier means and provided periodically and continuously and corresponding to recording parameters for said audio signals; reading means for reading the audio signals from said first information carrier means; a second information carrier means connected to said first information carrier means via said reading means for receiving a mix of said audio signals; program mixing means including a plurality of controllable elements connected between said first and second carrier means and assigned to respective channels; said digital control signals including address signals identifying the controllable elements and recording parameter control signals for each channel; program mix control means connected between said first information carrier means and said controllable elements and connected to said source of digital control signals and responsive to said digital control signals to operate said controllable elements in accordance with said address signals and said recording parameter control signals, said program mix control means including means for decoding said digital control signals, means for storing said decoded signals, digital/analog converter means connected between said storage means and said controllable elements, and means for providing the decoded stored information to the respective controllable elements via said digital/analog converter means.

* * * * *